DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 7, 1972

896 O.G. 18

T896,012

PROCESS OF MODIFYING POLYCARBONAMIDE FIBERS WITH ORTHOPHENYLPHENOL

Jose J. Rufino, Geneva, Switzerland, assignor to E. I. du Pont de Nemours and Company, Wilmington, Del.

Filed Dec. 16, 1970, Ser. No. 98,876
Int. Cl. D06m *13/00*
U.S. Cl. 8—130.1
No Drawing. 14 Pages Specification

A process for finishing a fabric containing highly twisted continuous filament polycarbonamide yarns wherein at least 50 mol percent of the repeating units are of the formula:

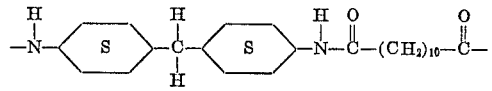

with at least 70% by weight of the diamino constituent of the repeating units being a trans-trans stereoisomeric configuration, comprising:

(A) stabilizing the fabric by heating it in open width in a medium selected from the group consisting of steam, air or water to induce from about 5 to 20% shrinkage in both warp and filling based on greige fabric dimensions;

(B) exposing the fabric to an acidic aqueous bath containing o-phenylphenol near the boil;

(C) removing the o-phenylphenol from the fabric by treating the same with an aqueous alkaline bath at a temperature near the boil, rinsing the fabric and drying the same, the amount of o-phenylphenol in the bath being between ½ to ¾ of the total amount of o-phenylphenol indicated by the following equation:

$$Y=10.1X-250$$

wherein Y is the bath-to-fabric weight ratio and X is the percent by weight of the amount of o-phenylphenol in the bath based on the weight of the fabric.